| United States Patent [19] | [11] Patent Number: 4,986,899 |
| Parsons | [45] Date of Patent: Jan. 22, 1991 |

[54] METHOD OF ADSORPTION

[75] Inventor: Peter J. Parsons, Redditch, England

[73] Assignee: British Gas plc, London, England

[21] Appl. No.: 407,055

[22] Filed: Sep. 14, 1989

[30] Foreign Application Priority Data

Sep. 14, 1988 [GB] United Kingdom ............... 8821514

[51] Int. Cl.$^5$ ............................................ C10G 25/00
[52] U.S. Cl. .................................. 208/310 R; 208/80;
208/310 Z; 585/826
[58] Field of Search ................. 208/310 Z, 310 R, 80;
55/20, 26, 59, 62; 585/826

[56] References Cited

U.S. PATENT DOCUMENTS 3,186,144  6/1965  Dow ........................................ 55/20
3,540,188  11/1970  Barrere, Jr. et al. .................... 55/20
4,350,501  9/1982  Bannon ........................... 585/826 X

FOREIGN PATENT DOCUMENTS

2083372  3/1982  United Kingdom .
2181667  4/1987  United Kingdom .

Primary Examiner—Curtis R. Davis
Attorney, Agent, or Firm—Oblon, Spivak, McClelland, Maier & Neustadt

[57] ABSTRACT

The invention relates to a method of operating an adsorption system using only two adsorption beds, for control of output quality of a gas containing a hydrocarbon. In the method before complete changeover of one bed A from adsorption to regeneration and of the other bed B from adsorption to regeneration, the adsorption feed gas flow is split into two streams of equal flow rate in the embodiment described, flowing in parallel through the beds and recombining the gas from the adsorbing bed A and the regenerating bed.

7 Claims, 8 Drawing Sheets

METHOD OF ADSORPTION

The invention relates to a method of adsorption particularly for adsorption of a hydrocarbon in a gas containing same during hydrocarbon, or combined water and hydrocarbon, dewpoint control. Hitherto, variations in processed gas quality were obtained unless multiple—i.e. three or more bed-systems were used, with at least two beds adsorbing and at least one regenerating at any one time. This process is more complex than for a two bed system, requiring additional control valves and pipework, and hence the capital cost of a plant is increased.

It is an advantage of the invention to seek to mitigate these disadvantages.

According to one aspect of the invention there is provided a method of operating an adsorption system for control of output quality of a gas containing a hydrocarbon, comprising providing two adsorption beds, providing a gas supply which is to be passed through the beds for adsorption of hydrocarbon, passing the gas through one bed from the source in an initial adsorption mode whilst regenerating the second bed, and then before changeover of the beds from continuous adsorption to regeneration and vice versa, splitting the adsorption feed gas flow into streams flowing in parallel through both beds and recombining the gas from the adsorbing bed and the regenerated bed.

The process may include the step in which the parallel flow may be ceased and the flow passed to a single adsorbing bed by means of monitoring the condition of the recombined gas.

Preferably the monitoring step may comprise monitoring the hydrocarbon dewpoint of the recombined gas.

The process may include the step of regenerating a bed saturated with hydrocarbon after cessation of the parallel flow.

The process may comprise repeating the splitting of the gas flow and passing the streams in parallel through the beds operated in the opposite mode to their initial operating mode during passage of the split streams.

The step of splitting the gas streams may comprise providing two gas streams of equal flow rate.

There may be the provision of a control system to adjust the ratio of the flow rates to maintain minimum variation of desired parameters of the recombined gas stream.

According to a second aspect the invention provides a two-bed adsorption system when operated by a method as hereinbefore defined.

A process embodying the invention is hereinafter described, by way of example, with reference to the accompanying drawings.

Figure 1:
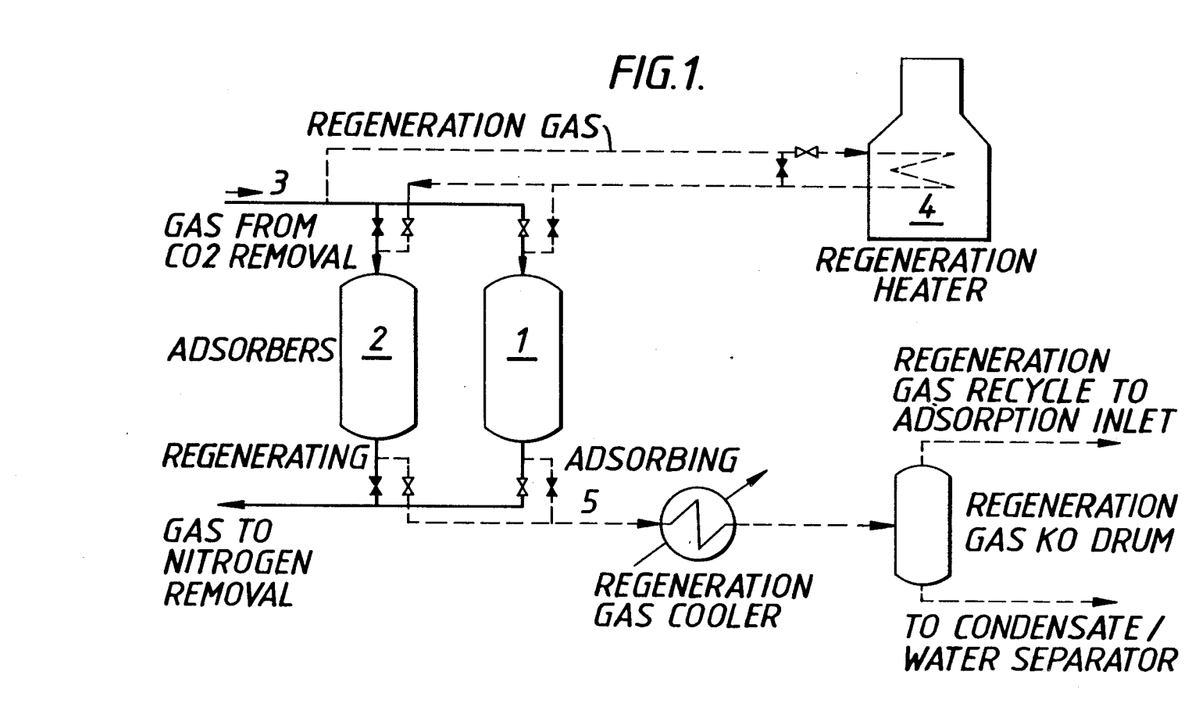
FIG. 1 shows schematically a conventional two bed adsorption system.

Referring to the drawings, FIG. 1 shows a conventional two bed adsorption system for hydrocarbon, or combined water and hydrocarbon, dewpoint control. In such a system one bed 1 is "on line" adsorbing whilst the second bed 2 is undergoing regeneration or is on standby. A proportion of the feed gas 3 is used for regeneration, which flows through a regeneration gas heater 4 (except during cooling when the heater is bypassed), and then through the bed 2 in a downwards direction. The outlet regeneration gas is cooled (when necessary) and the desorbed hydrocarbons are condensed from the gas. The regeneration gas 5 after separation of the desorbed liquids rejoins the feed gas to the adsorbing bed 1. The adsorption gas also flows through the bed in a downward direction and the hydrocarbon dewpoint of the outlet or processed gas increases as the adsorption time increases. Changeover from the adsorbing bed 1 to the regenerated bed 2 occurs before the hydrocarbon dewpoint specification is exceeded, with the regenerated bed held on standby if the regeneration is completed within the adsorption time. (For combined water and hydrocarbon dewpoint control, the water dewpoint specification will never be exceeded if the hydrocarbon dewpoint specification is met. This is because water is much more strongly adsorbed than hydrocarbons and is retained in the upper section of the bed, therefore water should never be present in the processed gas).

Figure 2:
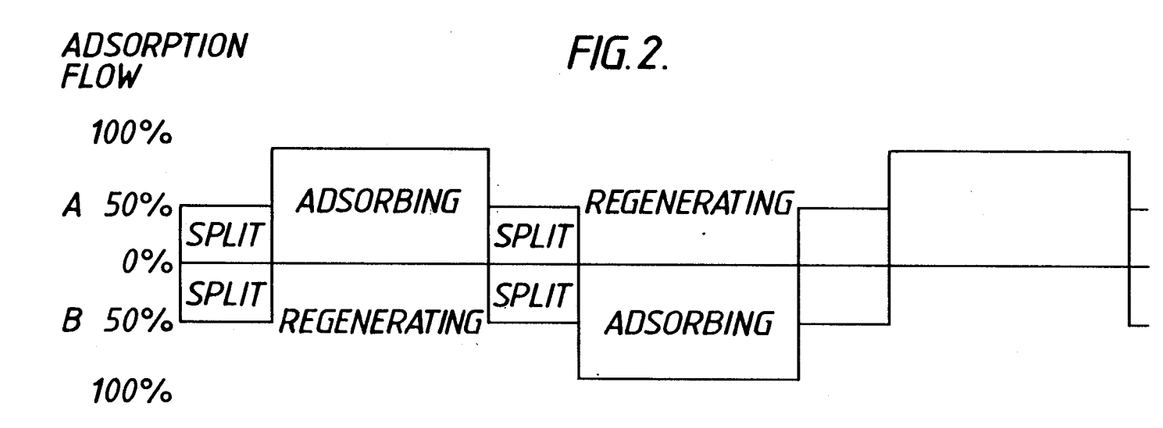
FIG. 2 shows schematically a method of operation of a two bed system according to the invention.

Turning now to FIG. 2, there is shown therein schematically a method of operation of a two bed system according to the invention. The method reduces variation in gas quality of processed gas, for example the method reduces variations in Calorific Value (CV), Wobbe Number, dewpoint and the like.

There are two adsorbing beds A and B. Before complete bed changeover from adsorption to regeneration, the adsorption feed gas flow is "split" into two equal streams flowing through both beds in parallel. During this period which could be termed an "overlapping" period of operation of both adsorbers A and B, the process gas from the recently regenerated bed and the continuously adsorbing bed is recombined. This has the advantage of "dampening" the gas quality variations by combining gas from the start of an adsorption period, which has relatively high CV, Wobbe and dewpoint with gas from the end of an adsorption period, which has relatively low CV, Wobbe and dewpoint. Changeover from the "overlapping" period to single bed operation is determined by the hydrocarbon dewpoint of the recombined gas. In addition to the "dampening" effect on the CV, Wobbe and dewpoint, the "overlapping" mode also achieves a greater utilization of the adsorbent in terms of hydrocarbon saturation. Thus the "overlapping" mode requires less adsorbent inventory than a conventional design when processing gas to the same specification. This is because during the "overlapping" period the hydrocarbon dewpoint of the gas from the continuously adsorbing bed is above specification whilst the dewpoint of the recombined gas remains within specification.

After the "overlapping" period the hydrocarbon saturated bed, say A, is regenerated with all the adsorption feed gas flowing through the bed B that has only experienced regenerating flow during the "overlapping" period. At the end of this adsorption period another "overlapping" period of "split" flow begins, and the cycle is repeated.

It will be understood that although the adsorption feed gas flow during the "overlapping" periods is described as "split" into two streams of equal flowrate, this value is not necessarily the optimum, but is the easiest to control as it gives equal pressure drops through both beds A and B. An "intelligent" control system could be used to adjust the ratio of the two flows to maintain minimum variations of hydrocarbon dewpoint, CV or Wobbe in the recombined gas; or to reduce operating costs by maximizing the time between regenerations.

Figure 3A:
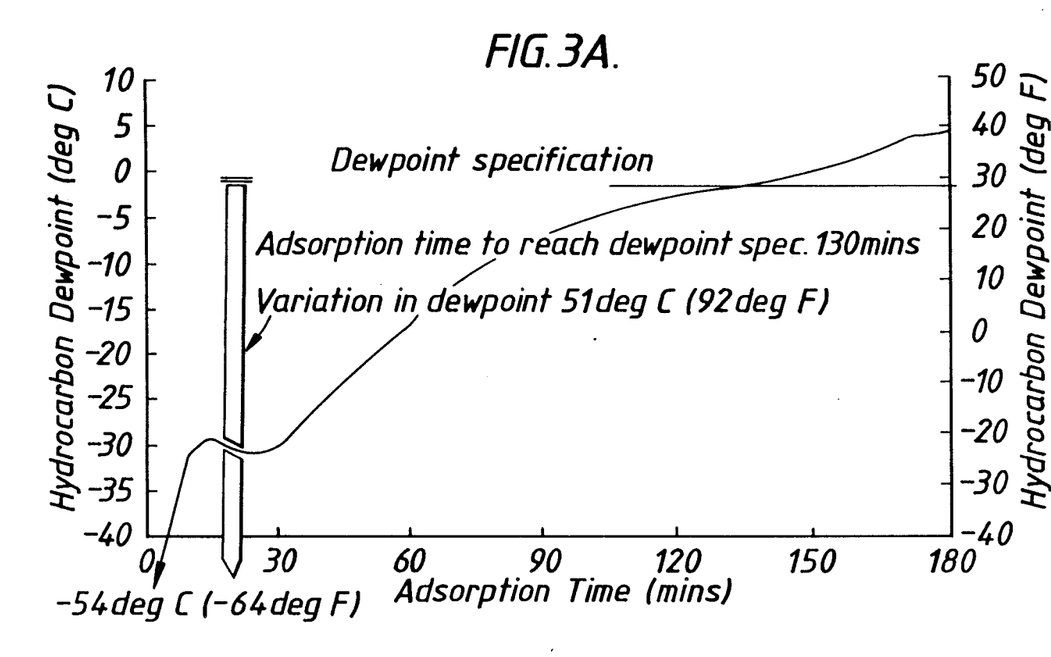
FIGS. 3 and 3B show graphically respectively a predicted variation in hydrocarbon dewpoint for a system like that of FIG. 1 and for a method of operation as depicted in FIG. 2.
Figure 3B:
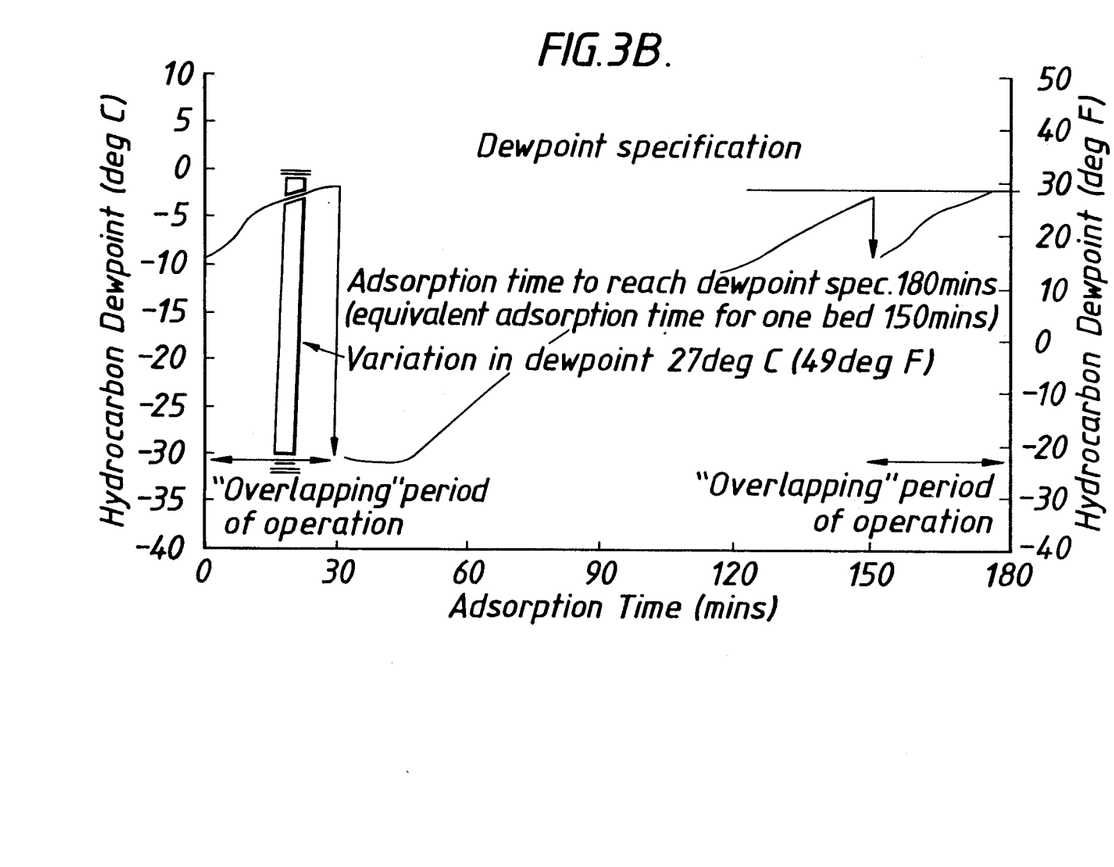

Referring now to FIGS. 3 to 6, FIGS. 3A and 3B show the predicted variation in hydrocarbon dewpoint for a conventional two bed design and for a method embodying the invention. The variation in dewpoint for the conventional design FIG. 3A is 51° C. (92° F.), whilst for the method of the invention FIG. 3B it is only 27° C. (49° F.) Also shown is the increased adsorption time for the "overlapping" design before the method of the invention the dewpoint specification is exceeded. For the dewpoint is exceeded after 180 minutes; this time is made up of two 30 minute "overlapping" periods of "split" flow operation and 120 minutes of single bed operation. Hence the equivalent adsorption time for all the feed gas through one bed is 150 minutes; this is 15% greater than the 130 minutes for the conventional design.

Figure 4A:
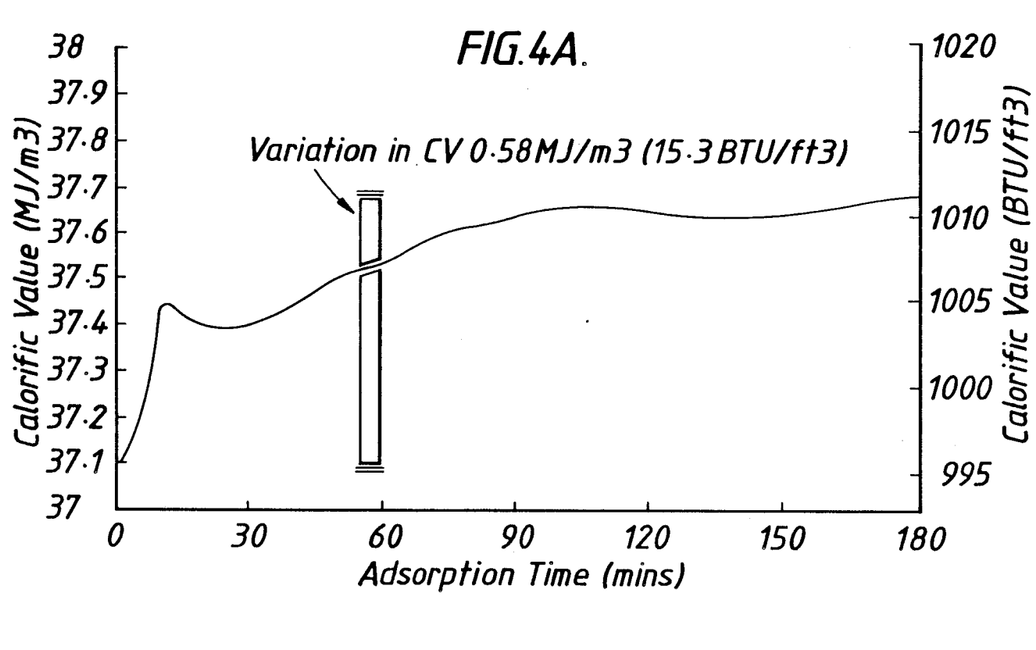
FIGS. 4A and 4B show graphically respectively a predicted variation in Calorific Value (CV) for a system like that of FIG. 1, and for a method of operation as depicted in FIG. 2.
Figure 4B:
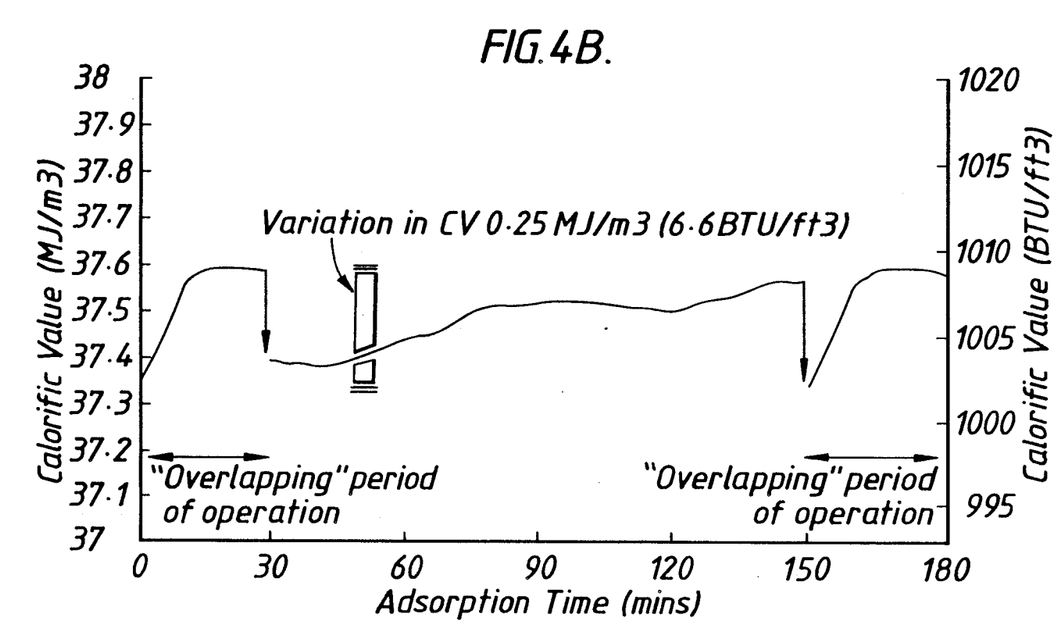

FIGS. 4A and 4B show the predicted variation in CV for a conventional two bed design and for a method embodying the invention. The variation in CV for the conventional design, FIG. 4A, is 0.58 MJ/m$^3$ (15.3 BTU/ft$^3$), whilst for the method of the invention, FIG. 4B, is reduced by more than 50% to only 0.25 MJ/m$^3$ (6.6 BTU/ft$^3$).

Figure 5A:
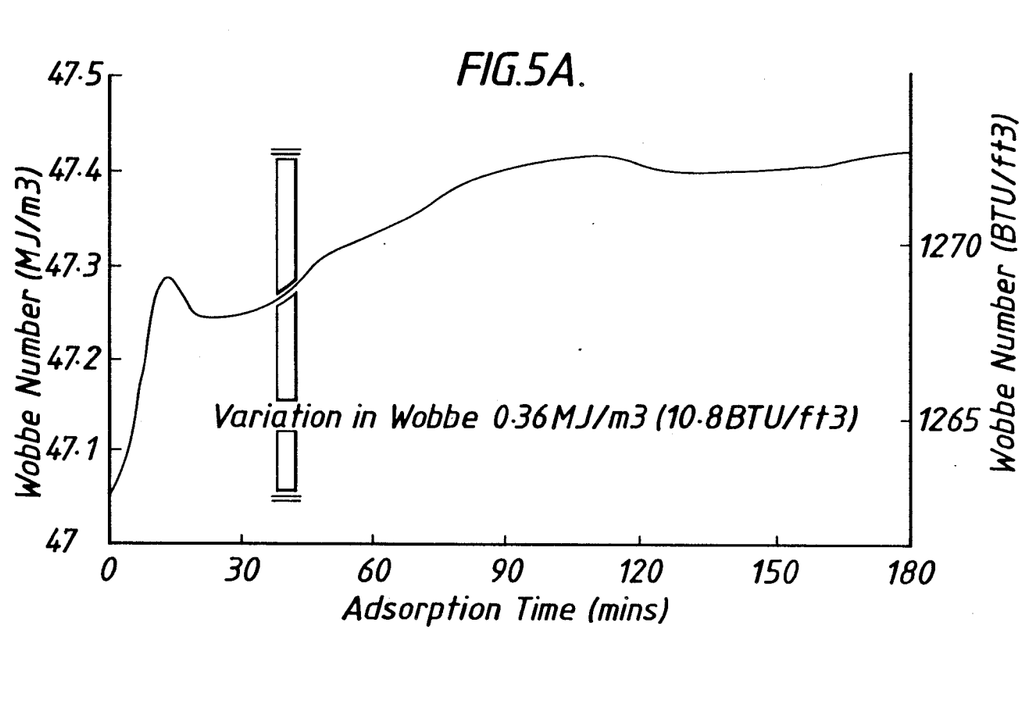
FIGS. 5A and 5B show graphically respectively the variation in Wobbe Number for a system like that of FIG. 1 and for a method of operation as depicted in FIG. 2.
Figure 5B:
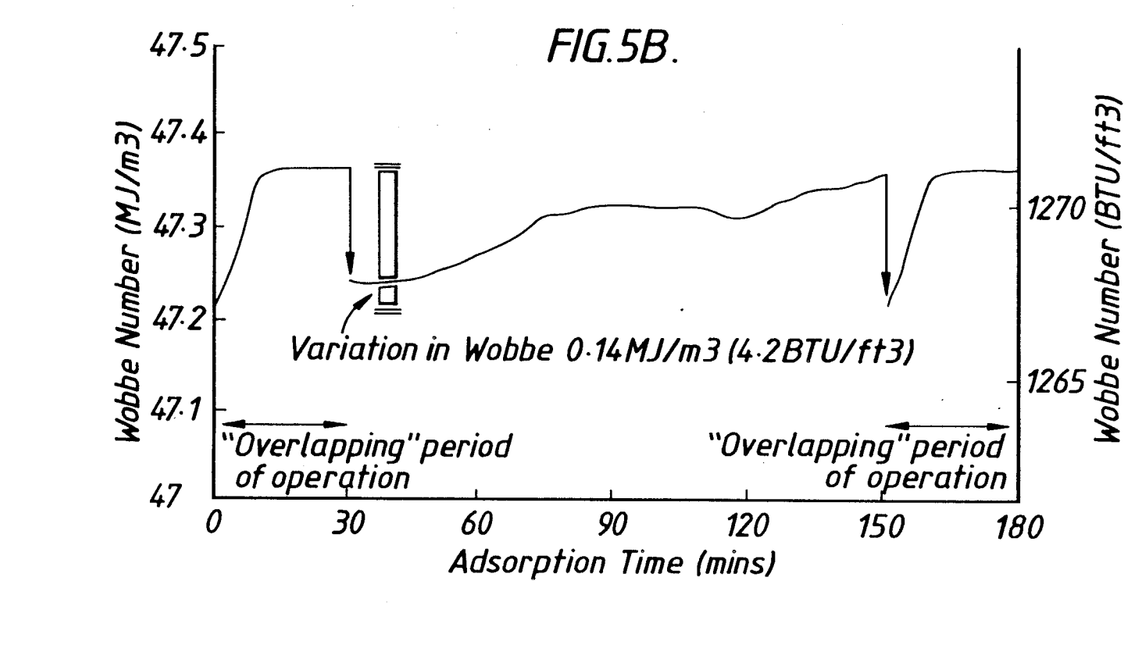

FIGS. 5A and 5B show the predicted variation in Wobbe Number for a conventional two bed design and for the method of the invention. The variation in Wobbe Number for the conventional design is 0.36 MJ/m$^3$ (10.8 BTU/ft$^3$), whilst for the method according to the invention this is reduced by more than 50% to only 0.14 MJ/m$^3$ (4.2 BTU/m$^3$).

Using the method of the invention, it is possible to provide for a limitation on variations in processed gas quality using only two adsorption beds. Moreover, the "overlapping" two bed design achieves greater utilization of adsorbent compared with a conventional two bed design. This advantage is achieved by adsorbing an increased loading of hydrocarbons prior to regeneration.

I claim:

1. A method of operating an adsorption system for control of the output quality of a gas containing a hydrocarbon comprising:
   providing two adsorption beds;
   providing a feed gas that is passed through the beds whereby hydrocarbon is absorbed;
   passing the feed gas through a first bed in an adsorption mode; and
   before changeover of said first bed from adsorption mode to regeneration mode,
   splitting the feed gas flow into parallel streams through both first and second absorption bed and recombining the output gas from said first bed and said second bed.

2. The process according to claim 1, in which the parallel flow is ceased and the flow is passed entirely to said second bed as determined by monitoring desired parameters of the recombined gas.

3. The process according to claim 2, in which the monitoring step comprises monitoring the hydrocarbon dewpoint of the recombined gas.

4. The process according to claim 2 or claim 3, comprising the step of regenerating said first bed after cessation of the parallel flow.

5. A process for continuously operating an adsorption system according to claim 4 further comprising;
   passing the feed gas through said second bed while regenerating said first bed; then
   after said first bed is regenerated and before changeover of said second bed from absorption mode to regeneration mode;
   splitting the feed gas flow into parallel streams through both first and second beds and recombining the output gas from the first and the second beds;
   said parallel flow is ceased and the flow is passed entirely to said first bed while regenerating said second bed as determined by monitoring desired parameters of the recombined gas.

6. The method according to claim 1, where the step of splitting the gas stream comprises providing two gas streams of equal flow rate.

7. The method according to claim 1, comprising providing a control system to adjust the ratio of the parallel flow rates to maintain minimum variation of desired parameters of the recombined gas stream.

* * * * *